(12) United States Patent
Lei

(10) Patent No.: US 11,190,721 B2
(45) Date of Patent: Nov. 30, 2021

(54) SIGNAL SEPARATION METHOD, PIXEL UNIT, AND PIXEL ARRAY

(71) Applicant: NINGBO ABAX SENSING CO., LTD., Zhejiang (CN)

(72) Inventor: Shuyu Lei, Ningbo (CN)

(73) Assignee: Ningbo ABAX Sensing Electronic Technology Co., Ltd., Ningbo (CN)

(*) Notice: Subject to any disclaimer, the term of this patent is extended or adjusted under 35 U.S.C. 154(b) by 0 days.

(21) Appl. No.: 16/980,867

(22) PCT Filed: Sep. 18, 2018

(86) PCT No.: PCT/CN2018/106127
§ 371 (c)(1),
(2) Date: Sep. 15, 2020

(87) PCT Pub. No.: WO2019/200831
PCT Pub. Date: Oct. 24, 2019

(65) Prior Publication Data
US 2021/0014446 A1     Jan. 14, 2021

(30) Foreign Application Priority Data

Apr. 16, 2018 (CN) .......................... 201810337858.5
Apr. 16, 2018 (CN) .......................... 201810338338.6

(51) Int. Cl.
*H04N 3/14* (2006.01)
*H04N 5/335* (2011.01)
(Continued)

(52) U.S. Cl.
CPC .......... *H04N 5/3745* (2013.01); *H04N 5/378* (2013.01); *H04N 5/359* (2013.01)

(58) Field of Classification Search
CPC ...... H04N 5/3745; H04N 5/378; H04N 5/359; H04N 5/37452; H04N 5/3559;
(Continued)

(56) References Cited

U.S. PATENT DOCUMENTS

| 2006/0170803 A1 | 8/2006 | Lim .............................. 348/308 |
| 2009/0295971 A1 | 12/2009 | Tsuchiya ........................ 348/311 |

(Continued)

FOREIGN PATENT DOCUMENTS

| CN | 1812508 A | 8/2006 |
| CN | 106576147 A | 4/2007 |

(Continued)

OTHER PUBLICATIONS

PCT, PCT/CN2018/106127 (WO 2019/200831), Sep. 18, 2018 (Oct. 24, 2019), Ningbo Abax Sensing Co., Ltd.
(Continued)

*Primary Examiner* — Kelly L Jerabek
(74) *Attorney, Agent, or Firm* — Ziegler IP Law Group, LLC

(57) ABSTRACT

A signal separation method, a pixel unit, and a pixel array are provided. The method comprises: determining a first threshold voltage between a first primary node of at least two primary nodes that stores first radiation charges and an adjacent subsequent-stage and controlling, when a second primary node of the at least two primary nodes that stores second radiation charges is electrically connected with an adjacent subsequent-stage node, a second threshold voltage between the second primary node and the adjacent subsequent-stage node so that echo radiation charges in the second radiation charges are transferred to the subsequent-stage The second threshold voltage is equal to the first threshold voltage; the first threshold voltage is used to make the background radiation charges included in the first radiation
(Continued)

---

S201, determining a first threshold voltage between a first primary node of at least two primary nodes that stores first radiation charges and an adjacent subsequent-stage node

↓

S202, separating, when a second primary node of the at least two primary nodes that stores second radiation charges is electrically connected with an adjacent subsequent-stage node, echo radiation charges from the second radiation charges by controlling a second threshold voltage between the second primary node and the subsequent-stage node according to the first threshold voltage

↓

S203, converting the separated echo radiation charges into echo radiation signals and outputting the echo radiation signals charges fully or partially remain in the first primary node when the first primary node is electrically connected with the subsequent-stage node.

20 Claims, 7 Drawing Sheets

(51) Int. Cl.
*H04N 5/3745* (2011.01)
*H04N 5/378* (2011.01)
*H04N 5/359* (2011.01)

(58) Field of Classification Search
CPC ......... H01L 27/14609; H01L 27/14603; H01L 27/14643; G01S 7/4863; G01S 7/4876; G01S 7/4873; G01S 7/4865; G01S 17/06; G01S 17/08; G01S 17/894
See application file for complete search history.

(56) References Cited

U.S. PATENT DOCUMENTS

| | | | |
|---|---|---|---|
| 2010/0308209 A1 | 12/2010 | Buettgen et al. | 250/208.1 |
| 2015/0281613 A1 | 10/2015 | Vogelsang | H04N 5/378 |
| 2017/0207257 A1 | 7/2017 | Nishihara | |
| 2019/0281238 A1* | 9/2019 | Kalgi | H01L 27/14612 |
| 2020/0309955 A1* | 10/2020 | Laflaquiere | G01S 17/894 |

FOREIGN PATENT DOCUMENTS

| | | |
|---|---|---|
| CN | 102484681 A | 5/2012 |
| CN | 105721801 A | 1/2016 |
| WO | WO 2019/200831 | 10/2019 |

OTHER PUBLICATIONS

The International Searching Authority mailed International Search Report dated Jan. 2, 2019 for International Application No. PCT/CN2018/106127, filed on Sep. 18, 2018 and published as WO 2019/200831 on Oct. 24, 2019 (Applicant—Ningbo Abax Sensing Co., Ltd.) (Original—3 Pages/ Translated—2 pages).

The International Searching Authority mailed Written Opinion of the International Searching Authority dated Jan. 2, 2019 for International Application No. PCT/CN2018/106127, filed on Sep. 18, 2018 and published as WO 2019/200831 on Oct. 24, 2019 (Applicant—Ningbo Abax Sensing Co., Ltd.)(Original—3 pages).

First Search of Priority Document for Chinese Application No. 2018103383386 (1 page).

* cited by examiner

SIGNAL SEPARATION METHOD, PIXEL UNIT, AND PIXEL ARRAY

This application is a U.S. National Phase Application of International Application No. PCT/CN2018/106127, filed Sep. 18, 2018, which claims priority to Chinese Application No. 201810338338.6, filed Apr. 16, 2018, and Chinese Application No. 201810337858.5, filed Apr. 16, 2018, each of which are hereby incorporated by reference in their entirety.

TECHNICAL FIELD

The embodiments of the present disclosure relate to the field of microelectronic technology, and particularly to a signal separation method, a pixel unit and a pixel array.

BACKGROUND ART

This section is intended to provide a background or context to the embodiments of the present disclosure set forth in the claims. The description herein is not admitted to be the prior art for being included in this section.

At present, complementary metal oxide semiconductor (CMOS) sensors, such as CMOS image sensors, are of great concern because of their low cost and suitability for mass production. Taking the current common Time Of Flight (TOF) ranging method as an example, the principle of the TOF ranging method is that the transmitting end transmits a modulation radiation signal (i.e., an optical signal) to a target to be measured, and the target to be measured reflects the modulation radiation signal to the receiving end, so that the receiving end is able to obtain the distance between the target to be measured and the transmitting end based on the round-trip time of the modulation radiation signal. Since light propagates very fast, the TOF ranging method requires that the image sensor in the receiving end has relatively high response speed and sensitivity.

In the existing image sensor, the surface defects of the device structure may cause common mode offsets such as dark current and noise inside the image sensor. However, due to the device performance problems, the existing image sensor cannot separate these common mode offsets from the effective signal after receiving the radiation signal, so that the signal-to-noise ratio of the output signal of the image sensor is relatively poor, and the sensitivity of the image sensor is relatively poor.

In conclusion, the existing image sensor cannot meet the requirements for sensors in many fields, such as long distance ranging, high precision ranging, high dynamic imaging, high frame rate imaging, etc.

SUMMARY

In this context, the embodiments of the present disclosure desirably provide a signal separation method, a pixel unit and a pixel array, so as to solve the problem that the existing image sensor cannot output a high-performance image signal with a relatively good signal-to-noise ratio, and cannot meet the requirements for sensors in many fields such as long distance and high precision ranging, high dynamic imaging, high frame rate imaging, etc.

In a first aspect of the embodiments of the present disclosure, there is provided a signal separation method, comprising:

determining a first threshold voltage between a first primary node of at least two primary nodes that stores first radiation charges and an adjacent subsequent-stage (post-stage) node; and controlling, when a second primary node of the at least two primary nodes that stores second radiation charges is electrically connected with an adjacent subsequent-stage node, a second threshold voltage between the second primary node and the adjacent subsequent-stage node so that echo radiation charges in the second radiation charges are transferred to the subsequent-stage node;

wherein the second threshold voltage is equal to the first threshold voltage, the first radiation charges include background radiation charges, the second radiation charges include background radiation charges and echo radiation charges, and the first threshold voltage is used to make the background radiation charges included in the first radiation charges fully or partially remain in the first primary node when the first primary node is electrically connected with the subsequent-stage node.

In one embodiment of the present disclosure, the first threshold voltage and the second threshold voltage are static values within a preset range, or the first threshold voltage and the second threshold voltage are dynamic values that vary depending on the amount of the first radiation charges.

In one embodiment of the present disclosure, the first threshold voltage is not greater than a first primary node voltage, and the first primary node voltage refers to the maximum value of the voltage converted from the charges stored in the first primary node.

In one embodiment of the present disclosure, a first radiation charge converted voltage refers to the value of the voltage converted from the first radiation charges stored in the first primary node; and the first threshold voltage is not smaller than a first radiation charge storage voltage.

In one embodiment of the present disclosure, the step that the second primary node of the at least two primary nodes that stores the background radiation charges and the echo radiation charges is electrically connected with the adjacent subsequent-stage node comprises: the second primary node being electrically connected with the adjacent subsequent-stage node, and the second primary node being electrically disconnected with a photosensitive unit, wherein the photosensitive unit is configured to receive a first radiation to generate background radiation charges and receive a second radiation to generate background radiation charges and echo radiation charges.

In one embodiment of the present disclosure, when the subsequent-stage node includes nodes of multiple stages, threshold voltages between the nodes of multiple stages are configured to be in an increasing trend along a direction of transferring charges.

In one embodiment of the present disclosure, before determining the first threshold voltage between the first primary node of the at least two primary nodes that store the first radiation charges and the subsequent-stage node, the method further comprises:

generating first radiation charges based on a first radiation received within a first predetermined time period, and transferring the first radiation charges to the first primary node for storage, the first radiation comprising a background radiation; and generating second radiation charges based on a second radiation received within a second predetermined time period, and transferring the second radiation charges to the second primary node for storage, the second radiation comprising a background radiation and an echo radiation.

In one embodiment of the present disclosure, the duration corresponding to the first predetermined time period is the same as the duration corresponding to the second predetermined time period.

In one embodiment of the present disclosure, after controlling the second threshold voltage between the second primary node and the subsequent-stage node so that the echo radiation charges are transferred to the subsequent-stage nodes, the method further comprises: resetting the at least two primary nodes and the subsequent-stage nodes.

Corresponding to the first aspect, in a second aspect of the embodiments of the present disclosure, there is provided a signal separation method, comprising:

determining a first threshold voltage between a first primary node of at least two primary nodes that stores first radiation charges and an adjacent subsequent-stage node;

controlling, when a second primary node of the at least two primary nodes that stores second radiation charges is electrically connected with an adjacent subsequent-stage node, a second threshold voltage between the second primary node and the adjacent subsequent-stage node according to the first threshold voltage to separate echo radiation charges from the second radiation charges; and converting the separated echo radiation charges into echo radiation signals and outputting the echo radiation signals;

wherein the second threshold voltage is equal to the first threshold voltage, the first radiation charges include background radiation charges, the second radiation charges include background radiation charges and echo radiation charges, and the first threshold voltage is used to make, when the first primary node is electrically connected with the adjacent subsequent-stage node, the background radiation charges included in the first radiation charges fully or partially remain in the first primary node.

In a third aspect of the embodiments of the present disclosure, there is further provided a pixel unit, comprising at least two primary nodes and subsequent-stage nodes, a first primary node of the at least two primary nodes storing first radiation charges, a second primary node of the at least two primary nodes storing second radiation charges, the first radiation charges including background radiation charges, the second radiation charges including background radiation charges and echo radiation charges, the pixel unit further comprising:

a determining unit configured to determine a first threshold voltage between the first primary node and an adjacent subsequent-stage node; and a separating unit configured to control, when the second primary node is electrically connected with an adjacent subsequent-stage node, a second threshold voltage between the second primary node and the subsequent-stage node so that echo radiation charges in the second radiation charges are transferred to the subsequent-stage node;

wherein the second threshold voltage is equal to the first threshold voltage, and the first threshold voltage is used to make, when the first primary node is electrically connected with the adjacent subsequent-stage node, the background radiation charges included in the first radiation charges fully or partially remain in the first primary node.

In one embodiment of the present disclosure, the first threshold voltage and the second threshold voltage are static values within a preset range, or the first threshold voltage and the second threshold voltage are dynamic values that vary depending on the amount of the first radiation charges.

In one embodiment of the present disclosure, the first threshold voltage is not greater than a first primary node voltage, and the first primary node voltage refers to the maximum value of the voltage converted from the charges stored in the first primary node.

In one embodiment of the present disclosure, a first radiation charge converted voltage refers to the value of the voltage converted from the first radiation charges stored in the first primary node; and the first threshold voltage is not smaller than a first radiation charge storage voltage.

In one embodiment of the present disclosure, the step that the second primary node of the at least two primary nodes that stores the background radiation charges and the echo radiation charges is electrically connected with the adjacent subsequent-stage node comprises: the second primary node being electrically connected with the adjacent subsequent-stage node, and the second primary node being electrically disconnected with a photosensitive unit, wherein the photosensitive unit is configured to receive a first radiation to generate background radiation charges and receive a second radiation to generate background radiation charges and echo radiation charges.

In one embodiment of the present disclosure, when the subsequent-stage node includes nodes of multiple stages, threshold voltages between the nodes of multiple stages are configured to be in an increasing trend along a direction of transferring charge.

In one embodiment of the present disclosure, the pixel unit further comprises a photosensitive unit, configured to, before the determining unit determines the first threshold voltage between the first primary node of the at least two primary nodes that stores the first radiation charges and the subsequent-stage nodes:

generate first radiation charges based on a first radiation received within a first predetermined time period, and transferring the first radiation charges to the first primary node for storage, the first radiation comprising a background radiation; and generate second radiation charges based on a second radiation received within a second predetermined time period, and transferring the second radiation charges to the second primary node for storage, the second radiation comprising a background radiation and an echo radiation.

In one embodiment of the present disclosure, an exposure duration corresponding to generating the background radiation charges is the same as an exposure duration corresponding to generating the echo radiation charges.

In one embodiment of the present disclosure, the pixel unit further comprises a resetting unit, configured to:

reset the at least two primary nodes and the subsequent-stage nodes, after the separating unit controls the second threshold voltage between the second primary node and the subsequent-stage node according to the first threshold voltage to transfer the echo radiation charges to the subsequent-stage nodes.

Corresponding to the third aspect, in a fourth aspect of the embodiments of the present disclosure, there is provided a pixel unit, comprising at least two primary nodes and subsequent-stage nodes, a first primary node of the at least two primary nodes storing first radiation charges, a second primary node of the at least two primary nodes storing second radiation charges, the first radiation charges including background radiation charges, the second radiation charges including background radiation charges and echo radiation charges, the pixel unit further comprising:

a determining unit configured to determine a first threshold voltage between the first primary node and an adjacent subsequent-stage node;

a separating unit configured to control, when the second primary node is electrically connected with an adjacent subsequent-stage node, a second threshold voltage between the second primary node and the adjacent subsequent-stage node so that echo radiation charges in the second radiation charges are transferred to the subsequent-stage node; and an outputting unit configured to convert separated echo radiation charges into echo radiation signals and output the echo radiation signals;

wherein the second threshold voltage is equal to the first threshold voltage, and the first threshold voltage is used to make, when the first primary node is electrically connected with the subsequent-stage node, the background radiation charges included in the first radiation charges fully or partially remain in the first primary node.

In a fifth aspect of the embodiments of the present disclosure, there is provide an array, comprising a plurality of pixel units in the third aspect, or comprising a plurality of pixel units in the fourth aspect. The array is capable of executing any method in the first aspect, or executing any method executed in the second aspect.

BRIEF DESCRIPTION OF DRAWINGS

The above and other objects, features and advantages of the exemplary embodiments of the present disclosure will become readily understood by reading the following detailed description with reference to the accompanying drawings. In the drawings, several embodiments of the present disclosure are shown by way of representation but not limitation, in which.

In the drawings, the same or corresponding reference signs denote the same or corresponding parts.

DETAILED DESCRIPTION OF EMBODIMENTS

Figure 1A:
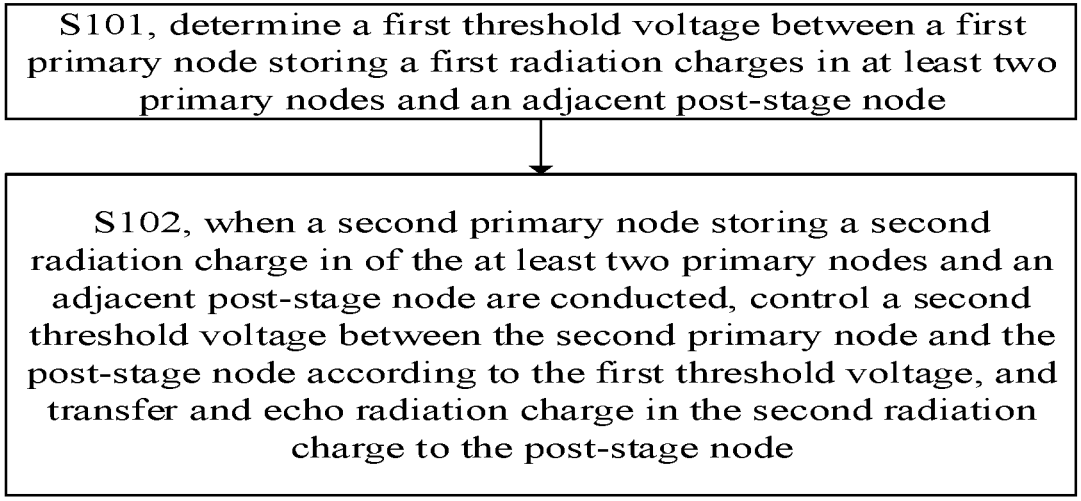
FIG. 1A schematically shows a flowchart of a signal separation method according to an embodiment of the present disclosure.

The principle and spirit of the present disclosure will be described below with reference to several exemplary embodiments. It should be understood that these embodiments are given only to enable those skilled in the art to better understand and to further practice the present disclosure, and not to limit the scope of the present disclosure in any way. Rather, these embodiments are provided to make the present disclosure more thorough and complete, and to enable the scope of the present disclosure to be fully conveyed to those skilled in the art.

In an existing image sensor, due to the surface defects of the device structure, common mode offsets such as dark current and noise will easily occur inside the device structure, and as a result, the image sensor cannot output a high-performance image signal with a relatively good signal-to-noise ratio. Thus, the existing image sensor cannot meet the requirements for sensors in many fields, such as long distance and high precision ranging, high dynamic imaging, high frame rate imaging, etc. In general, in the prior art, the energy of the echo radiation received by the image sensor may be weaker than the energy of the received background radiation, in this case, the photogenerated charges generated by the image sensor based on the echo radiation are weaker in the order of magnitude than the photogenerated charges generated based on the background radiation, and direct calculation may result in a relatively large calculation error. In order to improve the signal-to-noise ratio of the output signal and improve the performance of the pixel unit, the embodiments of the present disclosure provide a signal separation method, a pixel unit and a pixel array. In the above, the method, the pixel unit and the pixel array are based on a single inventive concept, and since the method, the pixel unit and the pixel array solve problems by similar principles, mutual reference may be made as to the implementation of the method, the pixel unit and the pixel array, and repeated description is omitted here.

The technical solutions provided by the embodiments of the present disclosure are applicable to interference signal cancellation scenes, especially to the scene of separating the background radiation from the echo radiation, for example, the scene of separating the background radiation from the echo radiation in the receiving end sensor at the time of performing long distance and high precision ranging on an object to be measured. The signals involved in the embodiments of the present disclosure include, but are not limited to, echo radiation and background radiation. Taking the scene of separating the background radiation from the echo radiation in the receiving end sensor in a ranging scene as an example, the echo radiation may be an echo signal received by the receiving end sensor that is generated by the object to be measured reflecting a ranging signal after the transmitting end transmits the ranging signal. The background radiation includes, but is not limited to, environment light in the testing environment, radiation signals transmitted by other devices and echo signals generated by the object to be measured reflecting other radiation signals.

The technical solutions provided by the embodiments of the present disclosure can be applied to a variety of systems, especially the systems having relatively high requirements for the quality of output signals or the systems having relatively high requirements for the performance of the sensor. The plurality of systems to which the embodiments of the present disclosure are applied may be the systems in various fields such as long distance and high precision ranging, high dynamic imaging, high frame rate imaging, etc. For example, suitable systems include, but are not limited to, automatic piloting systems, mapping systems, unmanned aerial vehicle tracking systems, machine vision systems, game system and artificial intelligence systems.

Below, various embodiments of the present disclosure will be described in detail with reference to the accompany drawings. It should be noted that the order of presentation of the embodiments of the present disclosure represents only the order of the embodiments, and does not represent the quality of the technical solutions provided by the embodiments.

An embodiment of the present disclosure provides a signal separation method, as shown in FIG. 1A, comprising:

S101, determining a first threshold voltage between a first primary node of at least two primary nodes that stores first radiation charges and an adjacent subsequent-stage node; and S102, transferring, when a second primary node of the at least two primary nodes that stores second radiation charges is electrically connected with an adjacent subsequent-stage node, echo radiation charges in the second radiation charges to the subsequent-stage node by controlling a second threshold voltage between the second primary node and the subsequent-stage node according to the first threshold voltage;

wherein the first threshold voltage is used to make, when the first primary node is electrically connected with the adjacent subsequent-stage node, the background radiation charges included in the first radiation charges fully or partially remain in the first primary node.

The at least two primary nodes and subsequent-stage nodes involved in the embodiments of the present disclosure may be charge storage devices or containers, which are not limited herein. Preferably, the at least two primary nodes and the subsequent-stage nodes may be capacitors. The threshold voltage involved in the embodiments of the present disclosure refers to a voltage applied to a transmission device between the at least two primary nodes and the subsequent-stage nodes, the transmission device here includes, but is not limited to, a threshold gate and a transmission gate, the threshold gate is a switching device controlled by voltage, for example, the threshold gate may be a MOS transistor. Optionally, the different primary nodes of the at least two primary nodes are each adjacent to a different subsequent-stage node.

Optionally, the turn-on and turn-off of the transmission device are controlled by a modulation signal so that the first radiation charges and the second radiation charges can be transmitted to different primary nodes.

In the embodiments of the present disclosure, the second threshold voltage is equal to the first threshold voltage. In the embodiments of the present disclosure, the first threshold voltage and the second threshold voltage are not limited to static values or dynamic values. For example, the first threshold voltage may be a static value within a preset range, or the first threshold voltage may be a dynamic value that varies depending on the amount of the first radiation charges. When the first threshold voltage is a dynamic value, the second threshold voltage varies dynamically according to the first threshold voltage. Taking the scene of automatic piloting as an example, the background radiation in this scene may vary with the environment in which the vehicle is located in the vehicle traveling process, and in order to be adapted to the varying background radiation, the first threshold voltage varies dynamically according to the background radiation, and accordingly, the second threshold voltage will also vary dynamically with the first threshold voltage, which helps to further eliminate the interference of the background radiation with the output signal.

Optionally, the first threshold voltage is not greater than a first primary node voltage, and/or the first threshold voltage is not smaller than a first radiation charge converted voltage. The first primary node voltage refers to the maximum value of the voltage converted from the charges stored in the first primary node, and the first radiation charge converted voltage refers to the value of the voltage converted from the first radiation charges stored in the first primary node. In one embodiment, the first radiation charge converted voltage may also be understood as the current voltage value converted from the first radiation charges currently stored in the first primary node, which facilitates dynamic adjustment of the first threshold voltage and the second threshold voltage, so as to further improve the background radiation suppression effect and quality of output signals.

In an embodiment of the present disclosure, the first radiation charges include background radiation charges, and the second radiation charges include background radiation charges and echo radiation charges; wherein the background radiation charges are photogenerated charges generated based on the background radiation, and the echo radiation charges are photogenerated charges generated based on the echo radiation. In one embodiment, prior to S101 or prior to S102, the first radiation charges are generated based on the first radiation received within a first predetermined time period, and the first radiation charges are transferred to the first primary node for storage, wherein the first radiation includes a background radiation; and the second radiation charges are generated based on the second radiation received within a second predetermined time period, and the second radiation charges are transferred to the second primary node for storage, wherein the second radiation includes a background radiation and an echo radiation. Preferably, the duration corresponding to the first predetermined time period is the same as the duration corresponding to the second predetermined time period. In this way, the charge amount of the background radiation charges included in the first radiation charges is the same as the charge amount of the background radiation charges included in the second radiation charges, helping to improve the effect of separating the background radiation charges from the second radiation charges.

In the embodiments of the present disclosure, the subsequent-stage nodes are not limited to be of a single stage or of multiple stages. When the subsequent-stage node includes nodes of multiple stages, threshold voltages between the nodes of multiple stages are configured to be in an increasing trend along a direction of transferring charge, that is, the threshold voltages between the nodes of multiple stages rise stage by stage, which helps to shorten the charge transfer time and improve efficiency of the charge transfer. Preferably, the nodes of multiple stages may also be used to further remove the background radiation charges from the second radiation charges. It should be noted that the specific implement method for removing the background radiation charges is similar to S101 and S102, and will not be described again herein. Also, the first primary node may be of a single stage or multiple stages, and as to the similarities, mutual reference can be made.

The subsequent-stage node adjacent to the second primary node is of N stages, wherein N is a positive integer greater than 2. Illustratively, if the background radiation in the second primary node is partially transferred to the nodes of N stages, the background radiation charges may remain in the previous nodes of N−1 stages and the echo radiation charges may be separated therefrom and transferred to the Nth-stage node, wherein the nodes of N stages are sequentially arranged in a direction away from the second primary node, the pinned voltages of the nodes of N stages increase in the direction away from the second primary node, and the potentials of the nodes of N stages decrease in the direction away from the second primary node.

Figure 1B:
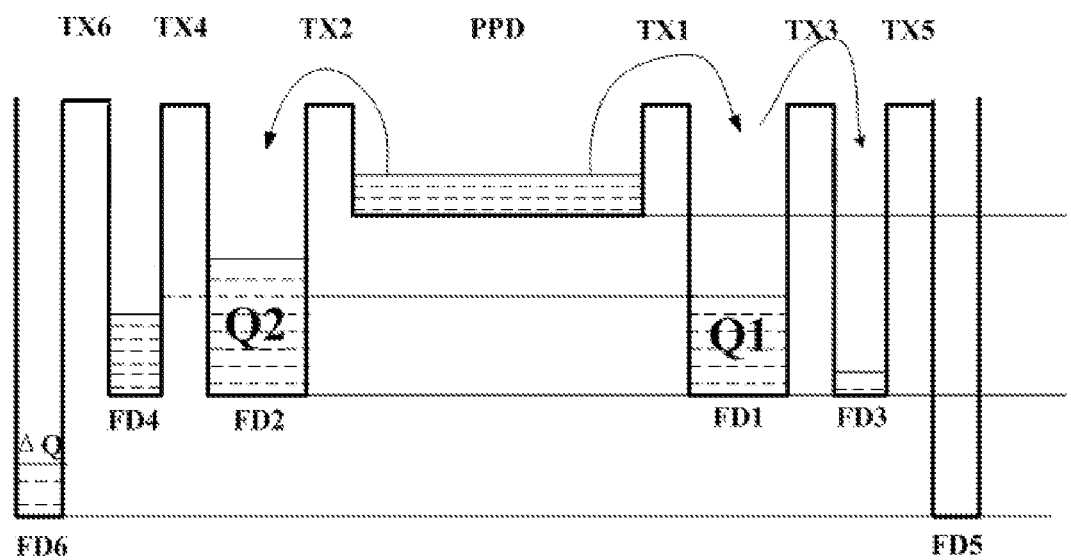
FIG. 1B schematically shows a potential diagram of a pixel unit according to an embodiment of the present disclosure.
Figure 1C:
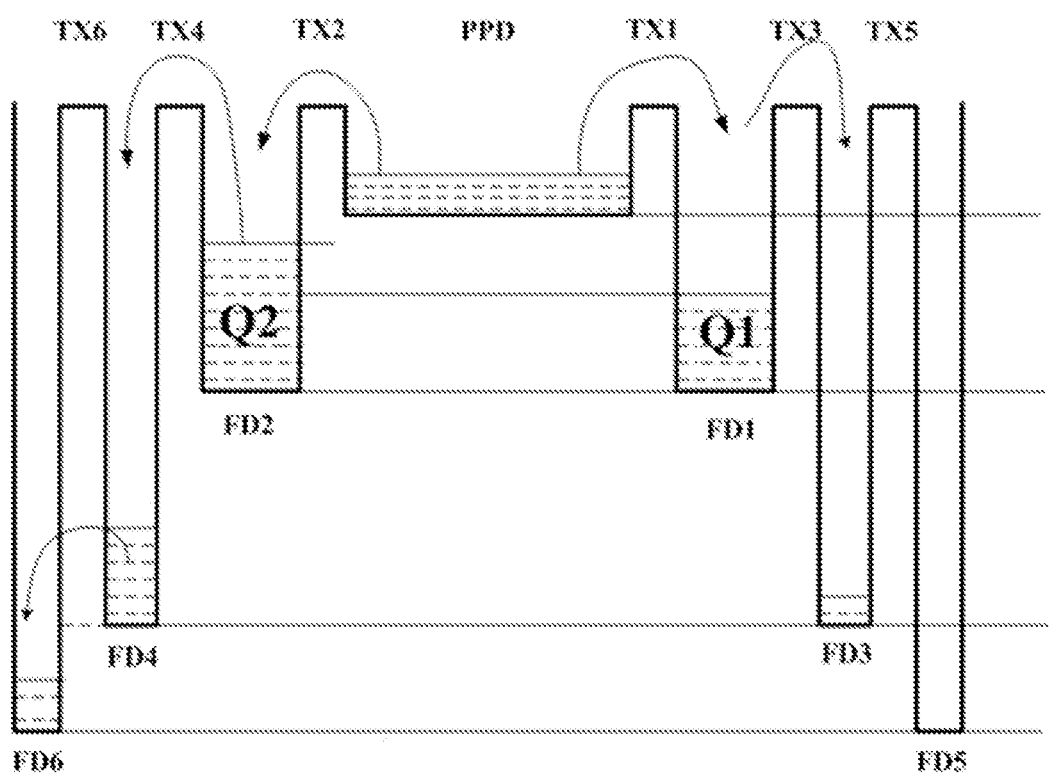
FIG. 1C schematically shows a potential diagram of a pixel unit according to an embodiment of the present disclosure.

Assuming that there are 3 first primary nodes and 3 second primary nodes, PPD is a pinned photodiode, FD1 is the first primary node, FD2 is the second primary node, FD3, FD4, FD5 and FD6 are subsequent-stage units, TX1 to TX6 are transmission units connected between the pinned photodiode, the first primary node, the second primary node, and the subsequent-stage units. According to the schematic diagram of the potential relationship between the photosensitive unit and the at least two primary nodes as shown in FIG. 1B, the potentials of FD1 to FD4 are the same, and the potentials of FD5 and FD6 are smaller than the potentials of FD1 to FD4. According to the schematic diagram of the potential relationship between the photosensitive unit and the at least two primary nodes as shown in FIG. 1C, the potentials of FD3 and FD4 are smaller than the potentials of FD1 and FD2, and the potentials of FD5 and FD6 are smaller than the potentials of FD3 and FD4.

In the embodiments of the present disclosure, the number of second primary nodes is not limited to be one or more, and when there are a plurality of second primary nodes, the plurality of second primary nodes may be connected to a single photosensitive unit, so that different second primary nodes can be used to store the radiation charges generated by the photosensitive unit at different moments or under different radiation conditions.

Next, the steps of the signal separation method shown in FIG. 1A will be described.

Referring to the above-described, in the embodiments of the present disclosure, the first threshold voltage and the second threshold voltage are not limited to static values or dynamic values. In S101, if the first threshold voltage is equal to the first radiation charge converted voltage, the background radiation charges included in the first radiation charges may fully remain in the first primary node when the first primary node is electrically connected with the adjacent subsequent-stage node; and if the value of the first threshold voltage is between the first radiation charge converted voltage and the first primary node voltage, the background radiation charges included in the first radiation charges may partially remain in the first primary node when the first primary node is electrically connected with the adjacent subsequent-stage node, in this case, the background radiation charges need to be removed by the subsequent-stage node, and as to the specific implementation method, reference may be made to the above relevant description.

In S101, there are many methods for determining the first threshold voltage between the first primary node of at least two primary nodes and the subsequent-stage node, which are not limited in the embodiments of the present disclosure. One possible method is to monitor the first primary node to obtain the first radiation charge converted voltage; set the first threshold voltage to a static value not smaller than the first radiation charge converted voltage and smaller than the first primary node voltage, when the first threshold voltage is a static value; and adjust the first threshold voltage to vary according to the first radiation charge converted voltage, when the first threshold voltage is a dynamic value. Preferably, the first threshold voltage is equal to the first radiation charge converted voltage. It should be noted that the specific manner of adjusting the threshold voltage value involved in the embodiments of the present disclosure is similar to the voltage adjusting manner in the prior art, which will not be repeated here.

In S102, the specific condition that the second primary node of the at least two primary nodes is electrically connected with the adjacent subsequent-stage node may be: the second primary node being electrically connected with the adjacent subsequent-stage node, and the second primary node being electrically disconnected with a photosensitive unit, wherein the photosensitive unit is configured to receive a first radiation to generate background radiation charges and receive a second radiation to generate background radiation charges and echo radiation charges; and the photosensitive unit may be a device that converts radiation into charges. For example, the photosensitive unit includes, but is not limited to, a photodiode and a laser diode. Preferably, the photosensitive unit may be a pinned photodiode. Further, the first threshold voltage is greater than the pinned voltage of the photosensitive unit. Optionally, the turning-on and turning-off of connection between the photosensitive unit, the second primary node and the adjacent subsequent-stage node are controlled by a modulation signal.

In S102, if the second primary node is electrically connected with the adjacent subsequent-stage node and the second primary node is electrically disconnected with the photosensitive unit, when the second threshold voltage is set to a voltage value equal to the first threshold voltage, since the first threshold voltage can make background radiation charges included in the first radiation charges fully or partially remain in the first primary node when the first primary node is electrically connected with the adjacent subsequent-stage node, the background radiation charges included in the second radiation charges will also fully or partially remain in the second primary node, while the echo radiation charges included in the second radiation charges will be transferred to the subsequent-stage node, thereby realizing the separation of background radiation signals from the echo radiation signals. It should be noted that there are many methods to realize S102, which are not limited in the embodiments of the present disclosure.

In one embodiment, when the values of the first threshold voltage and the second threshold voltage are equal to the first radiation charge converted voltage, the background radiation charges in the second radiation charges can be fully remained in the second primary node, while the echo radiation charges can be fully transferred to the subsequent-stage node adjacent to the second primary node, so as to realize the complete separation between the background radiation charges and the echo radiation charges, thereby improving the background radiation suppression effect and the output signal quality, and also contributing to improving the ranging accuracy.

In another embodiment, when the values of the first threshold voltage and the second threshold voltage are between the first radiation charge converted voltage and the first primary node voltage, only part of the background radiation charges in the first radiation charges are transferred to the adjacent subsequent-stage node, and part of the background radiation and all of the echo radiation in the second radiation charges are transferred to the subsequent-stage node adjacent to the second primary node. At this time, the difference in charge amount between the subsequent-stage node adjacent to the first primary node and the subsequent-stage node adjacent to the second primary node is the echo radiation charge, which also improves the background radiation suppression effect and the output signal quality, and also contributes to improving the ranging accuracy.

It should be noted that the timing at which the second threshold voltage is applied may be the same as the timing at which the first threshold voltage is applied, or the timing at which the second threshold voltage is applied may be different from the timing at which the first threshold voltage is applied, which is not described again herein. The timing at which S101 and/or S102 are performed is not limited in embodiments of the present disclosure. In the actual application, after S101 is performed, S102 may be performed several times, or performed only one time.

The echo radiation received by the photosensitive unit tends to be relatively weak in energy, and this will easily result in a small difference in charge amount of the radiation charges between the at least two primary nodes, thereby resulting in a relatively large deviation in the calculated difference of the charge amounts. Optionally, the above-described calculation process may be performed after multiple transfers of the radiation charges in the at least two primary nodes to the subsequent-stage nodes, so as to reduce the deviation in the calculated difference of the charge amounts and improve the accuracy of the output signals.

Optionally, the at least two primary nodes and the subsequent-stage nodes are reset after S102, i.e., the charges stored in the at least two primary nodes and the subsequent-stage nodes are all removed to prevent these charges from interfering with the subsequent signal separation process. Optionally, the reset process is controlled by the modulation signal.

Optionally, radiation charges stored in the first primary node and the second primary node are read by a buffer, and these radiation charges are converted into voltage values, respectively, via the buffer.

In the signal separation method provided by the embodiments of the present disclosure, the threshold voltage between the nodes can be used to make the background radiation charges remain in the primary nodes and make the echo radiation charges transferred from the primary nodes to the subsequent-stage nodes, so as to isolate the background radiation charges from the echo radiation charges in different nodes, realizing the separation between the background radiation signals and the echo radiation signals, eliminating the interference of the background radiation with the output signals, and improving the background radiation suppression effect and the output signal quality.

Figure 2:
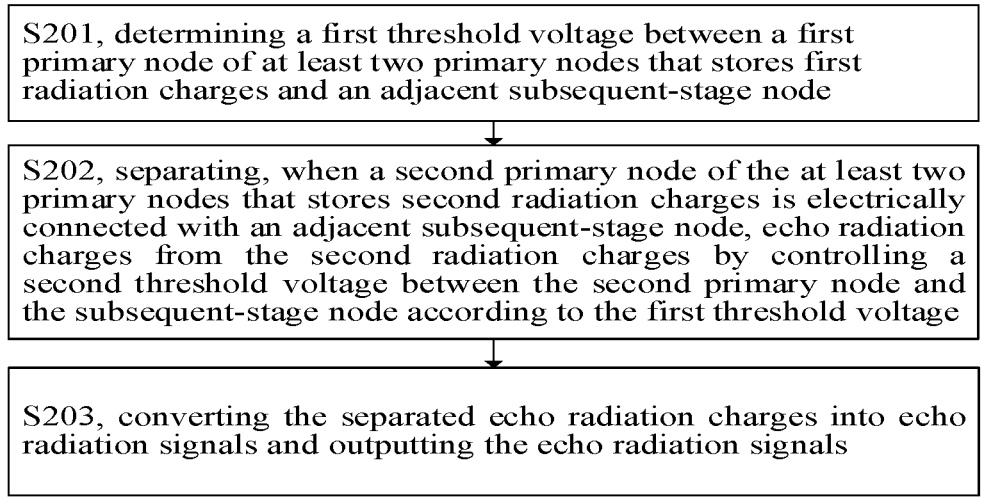
FIG. 2 schematically shows a flowchart of another signal separation method provided by an embodiment of the present disclosure.

Based on the signal separation method provided by the embodiment corresponding to FIG. 1A, an embodiment of the present disclosure further provides a signal separation method, as shown in FIG. 2, the method comprising:

S201, determining a first threshold voltage between a first primary node of at least two primary nodes that stores first radiation charges and an adjacent subsequent-stage node;

S202, separating, when a second primary node of the at least two primary nodes that stores second radiation charges is electrically connected with an adjacent subsequent-stage node, echo radiation charges from the second radiation charges by controlling a second threshold voltage between the second primary node and the subsequent-stage node according to the first threshold voltage; and S203, converting the separated echo radiation charges into echo radiation signals and outputting the echo radiation signals;

wherein the second threshold voltage is equal to the first threshold voltage, the first radiation charges include background radiation charges, the second radiation charges include background radiation charges and echo radiation charges, and the first threshold voltage is used to make, when the first primary node is electrically connected with the adjacent subsequent-stage node, the background radiation charges fully or partially remain in the first primary node.

It should be noted that S201 and S202 in the embodiment corresponding to FIG. 2 are similar to S101 and S102 in the embodiment corresponding to FIG. 1A, and as to the description about S201 and S202, reference can be made to the related description about S101 and S102 in the embodiment corresponding to FIG. 1A, which will not be repeated here. In addition to converting the separated echo radiation charges into echo radiation signals and outputting the echo radiation signals as described above, it is not limited in the embodiments of the present disclosure that in S203, the separated background radiation charges may also be converted into background radiation signals for output.

Optionally, the separated background radiation charges may also be converted into background radiation signals for outputting so as to further remove the background radiation charges and help to output echo radiation signals of better quality.

In the signal separation method provided by the embodiments of the present disclosure, the threshold voltage between the nodes can be controlled to separate the background radiation charges from the echo radiation charges in different nodes, and convert the echo radiation charges into echo radiation signals and output the echo radiation signals, thereby eliminating the interference of the background radiation with the output signals, realizing high quality output of the echo radiation signals, and greatly improving the background radiation suppression effect and the output signal quality.

The signal separation method described above will be explained below by way of example with reference to the drawings.

EXAMPLE 1

Figure 3:
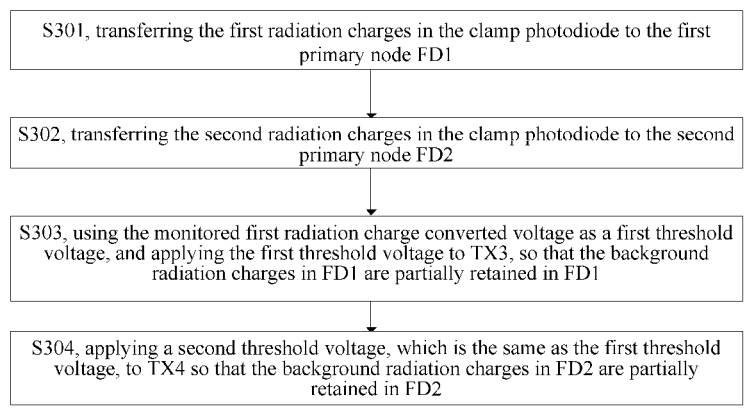
FIG. 3 schematically shows a flowchart of another signal separation method provided by an embodiment of the present disclosure.

Assuming that the photosensitive unit is a pinned photodiode (PPD), the first primary node is FD1, the second primary node is FD2, the subsequent-stage nodes are FD3 and FD4, the threshold gate between the pinned photodiode and FD1 is TX1, the threshold gate between the pinned photodiode and FD2 is TX2, the threshold gate between FD1 and FD3 is TX3, the first threshold voltage is applied to TX3, the threshold gate between FD2 and FD4 is TX4, and the second threshold voltage is applied to TX4, the steps of the signal separation method provided by an embodiment of the present disclosure are shown in FIG. 3, comprising:

S301, transferring the first radiation charges in the pinned photodiode to the first primary node FD1.

Figure 4:
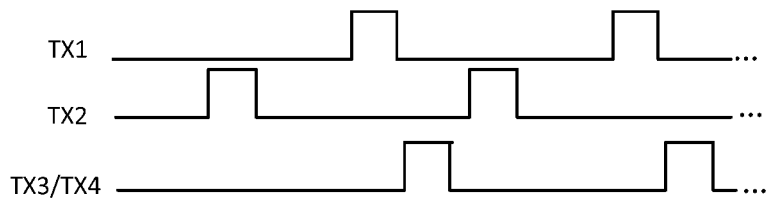
FIG. 4 schematically shows a timing diagram of a modulation signal provided by an embodiment of the present disclosure.
Figure 5:
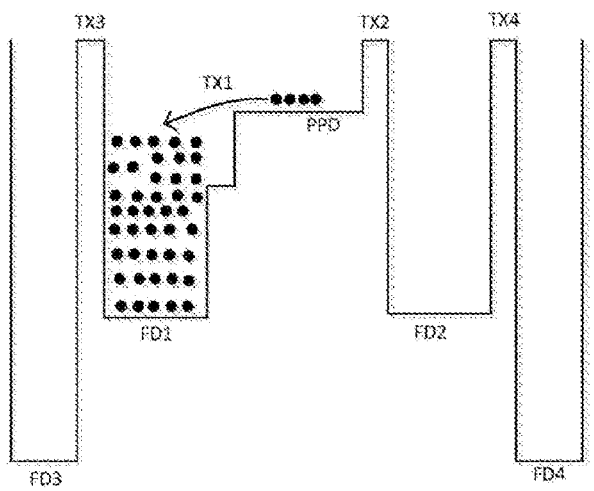
FIGS. 5-7B schematically show the process diagrams of the signal separation method provided by the embodiments of the present disclosure.

Prior to S301, the first radiation is converted to first radiation charges on the pinned photodiode, the first radiation includes a background radiation, and these first radiation charges include background radiation charges. Optionally, the threshold voltage on TX1 is controlled to vary dynamically by the modulation signal tx1, and the timing diagram of the tx1 is as shown in FIG. 4. TX1 is turned on when tx1 is at a high level, and at this time, the first radiation charges in the pinned photodiode are transferred, through TX1 to FD1, as shown in FIG. 5; and TX1 is turned off when tx1 is at a low level.

S302, transferring the second radiation charges in the pinned photodiode to the second primary node FD2.

Figure 6:
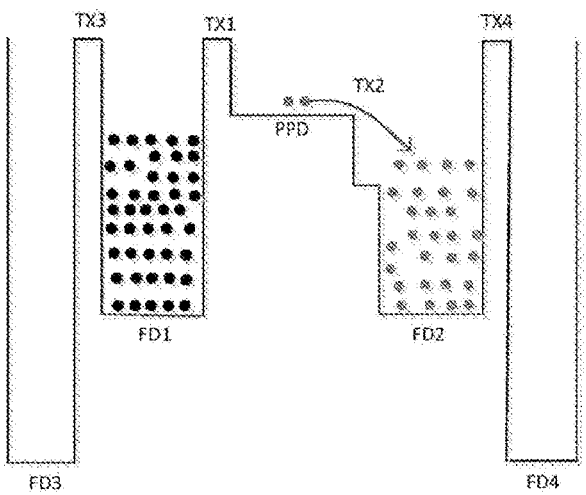

Prior to S302, the second radiation is converted to second radiation charges on the pinned photodiode, the second radiation includes an echo radiation and a background radiation, and the second radiation charges include background radiation charges and echo radiation charges. Optionally, the threshold voltage on TX2 is controlled to vary dynamically by the modulation signal tx2, and the timing diagram of the tx2 is as shown in FIG. 4. TX2 is turned on when tx2 is at a high level, and at this time, the second radiation charges in the pinned photodiode are transferred to FD2 through TX2, as shown in FIG. 6; and TX2 is turned off when tx2 is at a low level.

The first radiation charges and the second radiation charges are stored in different primary nodes by S301 and S302, which realizes spatial separation between the first radiation charges and the second radiation charges, and facilitates subsequent filtering of the background radiation charges from the second radiation charges based on the first radiation charges.

It should be noted that in S301 and S302, since TX1 is turned on for the same duration as TX2, the second radiation charges converted from the second radiation stored in the second primary node include the same amount of background radiation charges as those stored in the second primary node, and in this way, it is possible to remove the background radiation charges from the second radiation charges by making difference comparison between the second radiation charges and the first radiation charges in a later stage.

Figure 7:
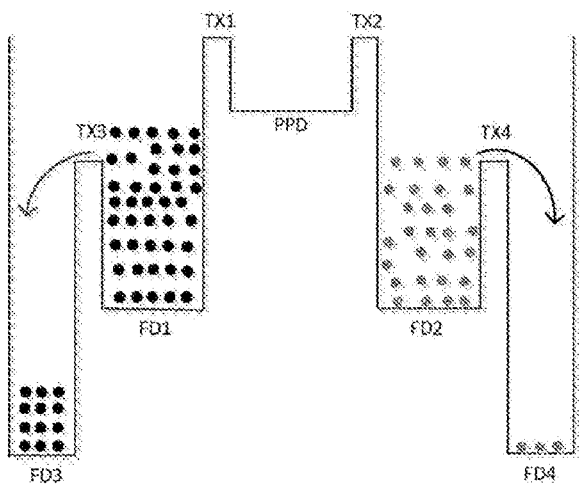

S303, after TX1 and TX2 are both turned off, monitoring first radiation charge converted voltage, taking a static voltage value greater than the first radiation charge converted voltage and smaller than the first primary node voltage as a first threshold voltage, and applying the first threshold voltage to TX3, so that the background radiation charges in FD1 partially remain in FD1, as shown in FIG. 7A.

S304, applying a second threshold voltage, which is the same as the first threshold voltage, to TX4 so that the background radiation charges in FD2 partially remain in FD2, thereby separating echo radiation charges from FD2 and transferring the same to FD4, as shown in FIG. 7A.

It should be noted that applying the second threshold voltage to TX4 in S304 may be performed after or before applying the first threshold voltage to TX3 in S303, or simultaneously with applying the first threshold voltage to TX3 in S303, which is not limited in the embodiments of the present disclosure.

The signal separation method described above is implemented just by steps S301 to S304, which greatly improves the background radiation suppression effect and the output signal quality.

EXAMPLE 2

Figure 7B:
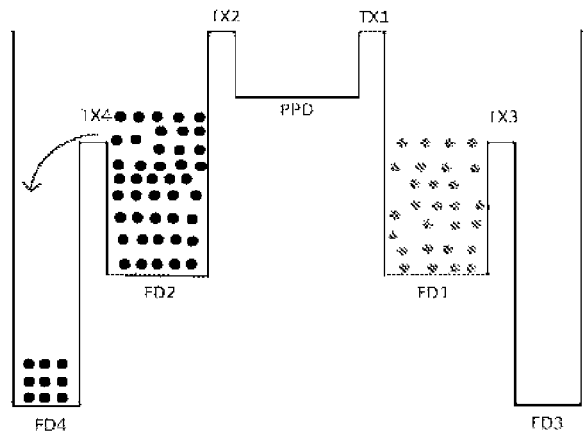

Assuming that the photosensitive unit is a pinned photodiode (PPD), the first primary node is FD1, the second primary node is FD2, the subsequent-stage nodes are FD3 and FD4, the threshold gate between the pinned photodiode and FD1 is TX1, the threshold gate between the pinned photodiode and FD2 is TX2, the threshold gate between FD1 and FD3 is TX3, the first threshold voltage is applied to TX3, the threshold gate between FD2 and FD4 is TX4, and the second threshold voltage is applied to TX4, the steps 1-2 in Example 2 are similar to S301-S302 in Example 1, mutual reference can be made, and no further description is made here. The Example 2 is mainly distinguished from the Example 1 in that:

Step 3, after TX1 and TX2 are both turned off, monitoring first radiation charge converted voltage, using first radiation charge converted voltage as a first threshold voltage, and applying the first threshold voltage to TX3, so that all the background radiation charges in FD1 remain in FD1, as shown in FIG. 7B.

Step 4, applying a second threshold voltage, which is the same as the first threshold voltage, to TX4 so that all the background radiation charges in FD2 remain in FD2, thereby separating echo radiation charges from FD2 and transferring the same to FD4, as shown in FIG. 7B.

The present disclosure provides a pixel unit implemented exemplarily, referring to 8, the pixel unit comprising at least two primary nodes and subsequent-stage nodes, a first primary node of the at least two primary nodes storing first radiation charges, a second primary node of the at least two primary nodes storing second radiation charges, the first radiation charges including background radiation charges, the second radiation charges including background radiation charges and echo radiation charges, the pixel unit further comprising:

a determining unit configured to determine a first threshold voltage between the first primary node and an adjacent subsequent-stage node; and a separating unit configured to control, when the second primary node is electrically connected with an adjacent subsequent-stage node, a second threshold voltage between the second primary node and the subsequent-stage node so that echo radiation charges in the second radiation charges are transferred to the subsequent-stage node;

wherein the second threshold voltage is equal to the first threshold voltage, and the first threshold voltage is used to make, when the first primary node is electrically connected with the adjacent subsequent-stage node, the background radiation charges included in the first radiation charges fully or partially remain in the first primary node.

Optionally, the first threshold voltage and the second threshold voltage are static values within a preset range, or the first threshold voltage and the second threshold voltage are dynamic values that vary depending on the amount of the first radiation charges.

Optionally, the first threshold voltage is not greater than a first primary node voltage, and the first primary node voltage refers to the maximum value of the voltage converted from the charges stored in the first primary node.

Optionally, a first radiation charge converted voltage refers to the value of the voltage converted from the first radiation charges stored in the first primary node; and the first threshold voltage is not smaller than a first radiation charge storage voltage.

Optionally, the step that the second primary node of the at least two primary nodes that stores the background radiation charges and the echo radiation charges is electrically connected with the adjacent subsequent-stage node comprises: the second primary node being electrically connected with the adjacent subsequent-stage node, and the second primary node being electrically disconnected with a photosensitive unit, wherein the photosensitive unit is configured to receive a first radiation to generate background radiation charges and receive a second radiation to generate background radiation charges and echo radiation charges.

Optionally, when the subsequent-stage node includes nodes of multiple stages, threshold voltages between the nodes of multiple stages are configured to be in an increasing trend along a direction of transferring charge.

Optionally, the pixel unit further comprises a photosensitive unit, configured to, before the determining unit determines the first threshold voltage between the first primary node of the at least two primary nodes that stores the first radiation charges and the subsequent-stage node:

generate first radiation charges based on a first radiation received within a first predetermined time period, and transfer the first radiation charges to the first primary node for storage, the first radiation comprising a background radiation; and generate second radiation charges based on a second radiation received within a second predetermined time period, and transferring the second radiation charges to the second primary node for storage, the second radiation comprising a background radiation and an echo radiation.

Optionally, an exposure duration corresponding to generating the background radiation charges is the same as an exposure duration corresponding to generating the echo radiation charges.

Optionally, the pixel unit further comprises a resetting unit, configured to: reset the at least two primary nodes and the subsequent-stage nodes, after the separating unit controls the second threshold voltage between the second primary node and the subsequent-stage node to transfer the echo radiation charges to the adjacent subsequent-stage node.

Figure 8:
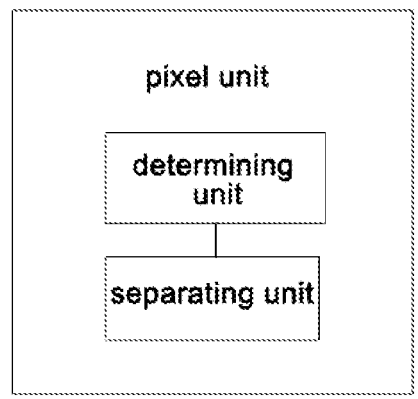
FIG. 8 schematically shows a structure diagram of a first pixel unit according to an embodiment of the present disclosure.
Figure 9:
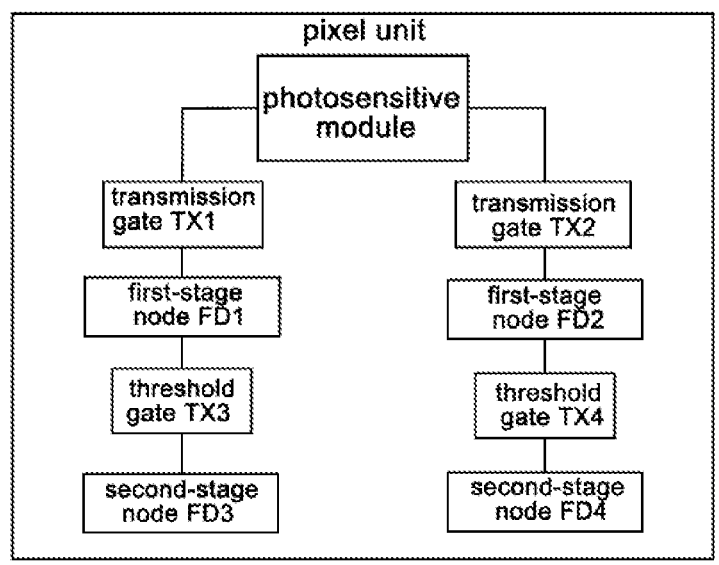
FIG. 9 schematically shows a structure diagram of a second pixel unit according to an embodiment of the present disclosure.

The present disclosure provides a pixel unit implemented exemplarily, which may be the same device as the pixel unit shown in FIG. 8, or may be a different device. Referring to FIG. 9, the pixel unit comprises a photoelectric conversion module configured to generate photogenerated charge carriers by photoelectrical conversion of an incident light, the incident light comprising a received radiation and a background light, the received radiation comprising laser radiation and background light; a transmission module configured to store the photogenerated charge carriers generated by the received radiation and the background light in two first-stage nodes, respectively, in a spatial separation manner; and a threshold controlled transmission module configured to transfer the photogenerated charge carriers generated by the laser radiation in the first-stage node to the second-stage node, and make the photogenerated charge carriers generated by the background light remain in the first-stage node; the threshold controlled transmission module including a threshold voltage having the same voltage value as the photogenerated charge carriers generated by the background light stored in the first-stage node.

For the pixel unit of this embodiment, the nodes storing the photogenerated charge carriers are separated into two stages by a threshold gate, and the photogenerated charge carriers converted from the background light remain in the first-stage node by applying a turn-on voltage to the threshold gate, in this way, there are almost no photogenerated charge carriers in the second-stage node corresponding to the first-stage node storing the background light, while what are in the second-stage node corresponding to the first-stage node storing the received radiation are substantially the photogenerated charge carriers converted from the laser radiation, and in this way, the background light and laser radiation can be separated from each other.

Further, the turn-on and turn-off of the transmission module and the threshold controlled transmission module are adjusted by the modulation signal.

Further, the photoelectric conversion module includes a pinned voltage, the first-stage node includes a first-stage node voltage, and the second-stage node includes a second-stage node voltage, wherein the pinned voltage is smaller than the first-stage node voltage, and the first-stage node voltage is smaller than the second-stage node voltage.

Further, the transmission module includes a first-stage turn-off voltage and a first-stage turn-on voltage, and the threshold controlled transmission module includes a second-stage turn-off voltage and a threshold voltage, wherein the first-stage turn-off voltage is the same as the second-stage turn-off voltage, and the first-stage turn-on voltage and the threshold voltage are both greater than the pinned voltage and smaller than the first-stage node voltage.

Further, the photogenerated charge carriers stored in the first-stage node and the second-stage node are read by a buffer and are converted into voltage values by the buffer respectively.

Further, the photogenerated charge carriers stored in the first-stage node are completely removed by a first-stage resetting device; the photogenerated charge carriers stored in the second-stage node are completely removed by a second-stage resetting device; and the first-stage resetting device is triggered by a first-stage reset signal, and the second-stage resetting device is triggered by a second-stage reset signal.

Further, the first-stage reset signal is triggered by a first-stage reset voltage, and when the threshold voltage is dynamic, the first-stage reset voltage is greater than the pinned voltage and smaller than the threshold voltage; and when the threshold voltage is dynamic, the first-stage reset voltage is greater than the pinned voltage and smaller than the first-stage node voltage.

It should be noted that, in the embodiments of the present disclosure, the pixel unit shown in FIG. 9 is similar to the pixel unit shown in FIG. 8, and as to the similarities, mutual reference can be made, and no further description is made here.

Figure 10:
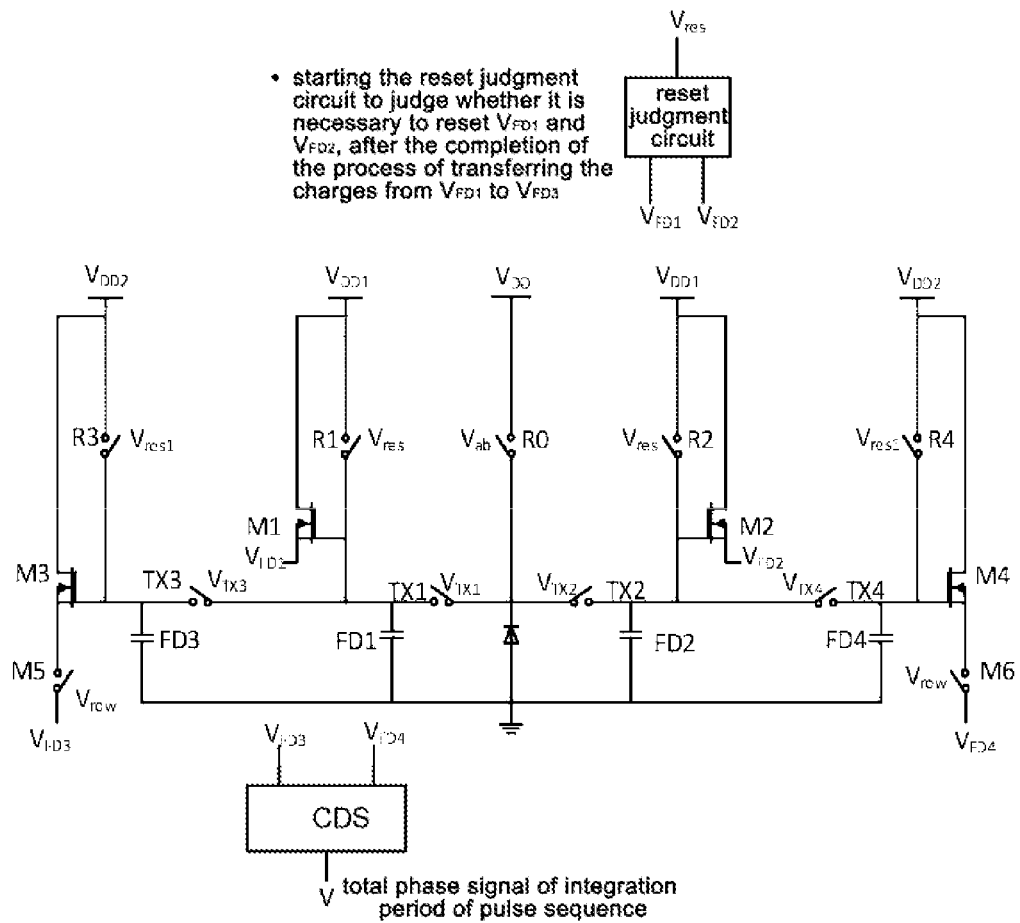
FIG. 10 schematically shows a structure diagram of a third pixel unit according to an embodiment of the present disclosure.

The present disclosure provides a CMOS pixel unit implemented exemplarily, and the CMOS pixel unit may be the same device as the pixel unit shown in FIG. 8 or FIG. 9. Referring to FIG. 10, the specific functions of the CMOS pixel unit are as follows:

In the present embodiment, the first-stage node includes a first-stage node voltage, and the second-stage node includes a second-stage node voltage, wherein the pinned voltage is smaller than the first-stage node voltage, and the first-stage node voltage is smaller than the second-stage node voltage. In FIG. 10, the first-stage nodes are a capacitor FD1 and a capacitor FD2, the second-stage nodes are a capacitor FD3 and a capacitor FD4, then the first-stage node voltage is VDD1, and the second-stage node voltage is VDD2; and the pinned voltage is VDD.

In the present embodiment, the transmission gate includes a first-stage turn-off voltage and a first-stage turn-on voltage, and the threshold gate includes a second-stage turn-off voltage and a threshold voltage, wherein the first-stage turn-off voltage is the same as the second turn-off voltage, and the first-stage turn-on voltage and the threshold voltage are both greater than the pinned voltage and smaller than the first-stage node voltage. In this embodiment, the transmission gate and the threshold gate have the same turn-off voltage which is 0 V, that is, the first-stage turn-off voltage and the second-stage turn-off voltage are 0 V; and in FIG. 10, the transmission gates are MOS transistors TX1 and TX2, the threshold gates are MOS transistors TX3 and TX4, the turn-on voltages of TX1, TX2, TX3 and TX4 are controlled by an external circuit, and it is only required that the first-stage turn-on voltage and the threshold voltage are both greater than the pinned voltage VDD and smaller than the first-stage node voltage VDD1.

In the present embodiment, the threshold voltage is equal to the voltage converted from the photogenerated charge carriers stored in the first-stage node of the two first-stage nodes that stores less photogenerated charge carriers, and greater than the pinned voltage.

In the present embodiment, the threshold voltage is equal to the voltage converted from the photogenerated charge carriers converted from the stored background light, so that the photogenerated charge carriers converted from the background light will be always remained in the first-stage node, and the photogenerated charge carriers converted from the laser radiation will be transferred to the second-stage nodes every time the threshold gate is turned on.

The present embodiment further includes a buffer configured to read the photogenerated charge carriers stored in the first-stage node and the second-stage node and convert the photogenerated charge carriers into voltage values, respectively. The buffer in this embodiment may be a source follower, the source voltage of the source follower follows the gate voltage, and the gate thereof is connected to the second-stage node or the first-stage node, then the source follower may read the voltage converted from the photogenerated charge carriers stored in the first-stage node or the second-stage node.

In FIG. 10, there are four source followers M1\M2\M3\M4 to read the voltage values $V_{FD1}\backslash V_{FD2}\backslash V_{FD3}\backslash V_{FD4}$ in the two first-stage nodes FD1\FD2 and the two second-stage nodes FD3\FD4, respectively. Specifically, the source follower is a MOS transistor, the source voltage of the MOS transistor follows the gate voltage, and the gate thereof is connected to the second-stage node or the first-stage node, then the source follower may read the voltage converted from the photogenerated charge carriers stored in the first-stage node or the second-stage node.

Since the photogenerated charge carriers converted from the background light in the first-stage node will keep on accumulating, it is necessary to remove all of them. The present embodiment further includes a first-stage resetting device group and a second-stage resetting device group. The first-stage resetting device group includes two first-stage resetting devices, and the two first-stage resetting devices are respectively configured to remove all of the photogenerated charge carriers stored in the first-stage nodes; and the second-stage resetting device group includes two second-stage resetting devices, and the two second-stage resetting devices are respectively configured to remove all of the photogenerated charge carriers stored in the second-stage nodes.

In the above, the conditions under which the first-stage resetting device resets the first-stage node are that the first-stage reset signal is triggered by the first-stage reset voltage, and the first-stage reset voltage is greater than the pinned voltage and smaller than the first-stage node voltage.

The present embodiment provides a specific structural diagram as shown in FIG. 10, wherein the first-stage nodes are a capacitor FD1 and a capacitor FD2, the second-stage nodes are a capacitor FD3 and a capacitor FD4, then the first-stage node voltage is VDD1, and the second-stage node voltage is VDD2; and the pinned voltage is VDD. The transmission gates are MOS transistors TX1 and TX2, the threshold gates are MOS transistors TX3 and TX4, the turn-on voltages of TX1, TX2, TX3 and TX4 are controlled by an external circuit, and it is only required that the first-stage turn-on voltage and the threshold voltage are both greater than the pinned voltage VDD and smaller than the first-stage node voltage VDD1. In FIG. 10, there are four source followers M1\M2\M3\M4 to read the voltage values $V_{FD1}\backslash V_{FD2}\backslash V_{FD3}\backslash V_{FD4}$ in the two first-stage nodes FD1\FD2 and the two second-stage nodes FD3\FD4, respectively. Specifically, the source follower is a MOS transistor, the source voltage of the MOS transistor follows the gate voltage, and the gate thereof is connected to the second-stage node or the first-stage node, then the source follower may read the voltage converted from the photogenerated charge carriers stored in the first-stage node or the second-stage node.

The photoelectric conversion module, the transmission module, the first-stage node, the threshold controlled transmission module and the second-stage node in this embodiment are integrated on a chip and implemented in a CMOS manner. Optionally, the second-stage resetting devices are configured to reset the second-stage nodes after each cycle.

It should be noted that, in the embodiments of the present disclosure, the CMOS pixel unit shown in FIG. 10, the pixel unit shown in FIG. 8 and the pixel unit shown in FIG. 9 are similar to one another, and as to the similarities, mutual reference can be made, and no further description is made here. The legends in FIGS. 9 and 10 are similar to the concepts in the embodiment corresponding to FIG. 1 above, the concepts including but not limited to: photogenerated charge carriers corresponding to radiation charges (including first radiation charges and/or second radiation charges), the received radiation corresponding to the second radiation, the background light corresponding to the first radiation or the background radiation, the laser radiation corresponding to the echo radiation, the photoelectric conversion module corresponding to the photosensitive unit, the first-stage nodes corresponding to the primary nodes, and the second-stage nodes corresponding to the subsequent-stage nodes, the transmission module corresponding to a transmission device between the photosensitive unit and the at least two primary nodes, and the threshold controlled transmission module corresponding to the transmission device between the at least two primary nodes and the subsequent-stage nodes.

The present disclosure further provides a pixel unit implemented exemplarily, referring to 11, the pixel unit comprising at least two primary nodes and subsequent-stage nodes, a first primary node of the at least two primary nodes storing first radiation charges, a second primary node of the at least two primary nodes storing second radiation charges, the first radiation charges including background radiation charges, the second radiation charges including background radiation charges and echo radiation charges, the pixel unit further comprising: a determining unit configured to determine a first threshold voltage between the first primary node and an adjacent subsequent-stage node; a separating unit configured to control, when the second primary node is electrically connected with the adjacent subsequent-stage node, a second threshold voltage between the second primary node and the adjacent subsequent-stage node so that echo radiation charges in the second radiation charges are transferred to the subsequent-stage node; and an outputting unit configured to convert separated echo radiation charges into echo radiation signals and output the echo radiation signals; wherein the second threshold voltage is equal to the first threshold voltage, and the first threshold voltage is used to make, when the first primary node is electrically connected with the adjacent subsequent-stage node, the background radiation charges included in the first radiation charges fully or partially remain in the first primary node.

Figure 11:
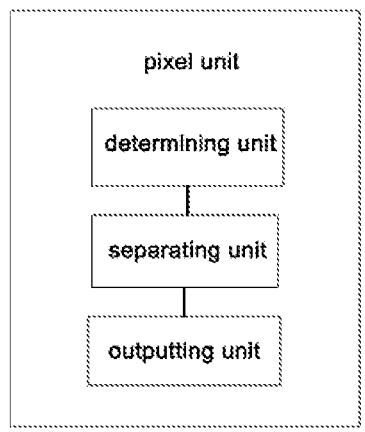
FIG. 11 schematically shows a structure diagram of a fourth pixel unit according to an embodiment of the present disclosure.

It should be noted that, in the embodiments of the present disclosure, the pixel unit shown in FIG. 11, the pixel unit shown in FIG. 8, the pixel unit shown in FIG. 9 and the pixel unit shown in FIG. 10 are similar to one another, and as to the similarities, mutual reference can be made, and no further description is made here.

The present disclosure further provides an array, comprising a plurality of pixel units shown in any of FIGS. 8-11.

It should be noted that although several units/modules or sub-units/modules of the apparatus have been mentioned in the above detailed description, this division is exemplary only and not mandatory. Indeed, according to the embodiments of the present disclosure, the features and functions of two or more units/modules described above may be embodied in one unit/module. Conversely, the features and functions of one unit/module described above may be embodied by being further divided into a plurality of units/modules.

In addition, although the operations of the methods of the present disclosure are described in a particular order in the drawings, this does not require or imply that these operations must be performed in that particular order, or that all of the illustrated operations must be performed in order to achieve the desired results. Additionally or alternatively, certain steps may be omitted, multiple steps may be combined into one step, and/or one step may be divided into multiple steps.

Although the spirit and principle of the present disclosure have been described with reference to several specific embodiments, it should be understood that the present disclosure is not limited to the disclosed specific embodiments, nor does the division of the aspects imply that the features in these aspects cannot be combined to benefit, such division being merely for the convenience of expression. The present disclosure is intended to cover various modifications and equivalent arrangements included in the spirit and scope of the appended claims.

The invention claimed is:

1. A signal separation method, comprising:
   determining a first threshold voltage between a first primary node of at least two primary nodes that stores first radiation charges and a subsequent-stage node adjacent to the first primary node; and
   controlling, when a second primary node of the at least two primary nodes that stores second radiation charges is electrically connected with a subsequent-stage node adjacent to the second primary node, a second threshold voltage between the second primary node and the subsequent-stage node adjacent to the second primary node so that echo radiation charges in the second radiation charges are transferred to the subsequent-stage node adjacent to the second primary node,
   wherein the second threshold voltage is equal to the first threshold voltage, the first radiation charges comprise background radiation charges, the second radiation charges comprise background radiation charges and echo radiation charges, and the first threshold voltage is used to make, when the first primary node is electrically connected with the subsequent-stage node adjacent to the first primary node, the background radiation charges in the first radiation charges fully or partially remain in the first primary node.

2. The method according to claim 1, wherein the first threshold voltage and the second threshold voltage are static values within a preset range, or the first threshold voltage and the second threshold voltage are dynamic values that vary depending on an amount of the first radiation charges.

3. The method according to claim 2, wherein the first threshold voltage is not greater than a first primary node voltage, and the first primary node voltage refers to a maximum value of the voltage converted from charges stored in the first primary node.

4. The method according to claim 1, wherein the first threshold voltage is not greater than a first primary node voltage, and the first primary node voltage refers to a maximum value of the voltage converted from charges stored in the first primary node.

5. The method according to claim 1, wherein a first radiation charge converted voltage refers to a value of the voltage converted from the first radiation charges stored in the first primary node; and
   the first threshold voltage is not smaller than the first radiation charge converted voltage.

6. The method according to claim 1, wherein the step that the second primary node of the at least two primary nodes that stores the background radiation charges and the echo radiation charges is electrically connected with the subsequent-stage node adjacent to the second primary node comprises:
   the second primary node is electrically connected with the subsequent-stage node adjacent to the second primary node, and the second primary node is electrically disconnected with photosensitive unit,
   wherein the photosensitive unit is configured to receive a first radiation to generate the background radiation charges and receive a second radiation to generate the background radiation charges and the echo radiation charges.

7. The method according to claim 1, wherein when at least one of the subsequent-stage nodes comprise nodes of multiple stages, threshold voltages between the nodes of multiple stages increase along a direction of transferring charges.

8. The method according to claim 1, wherein before determining the first threshold voltage between the first primary node of the at least two primary nodes that stores the first radiation charges and the subsequent-stage node, the method further comprises:
   generating the first radiation charges based on a first radiation received within a first predetermined time period, and transferring the first radiation charges to the first primary node for storage, the first radiation comprising a background radiation; and
   generating second radiation charges based on a second radiation received within a second predetermined time period, and transferring the second radiation charges to the second primary node for storage, the second radiation comprising a background radiation and an echo radiation.

9. The method according to claim 8, wherein a duration corresponding to the first predetermined time period is the same as a duration corresponding to the second predetermined time period.

10. The method according to claim 1, wherein, after controlling the second threshold voltage between the second primary node and the subsequent-stage node(s) so that the echo radiation charges are transferred to the subsequent-stage node(s), the method further comprises:
    resetting the at least two primary nodes and the subsequent-stage nodes.

11. A pixel unit, wherein the pixel unit comprises at least two primary nodes and subsequent-stage nodes, a first primary node of the at least two primary nodes storing first radiation charges, a second primary node of the at least two primary nodes storing second radiation charges, the first radiation charges comprising background radiation charges, the second radiation charges comprising background radiation charges and echo radiation charges, the pixel unit further comprising:
    a determining unit configured to determine a first threshold voltage between the first primary node and a subsequent-stage node; and
    a separating unit configured to control, when the second primary node is electrically connected with a subsequent-stage node adjacent to the second primary node, a second threshold voltage between the second primary node and the subsequent-stage node adjacent to the second primary node so that the echo radiation charges in the second radiation charges are transferred to the subsequent-stage node adjacent to the second primary node, wherein the second threshold voltage is equal to the first threshold voltage, and the first threshold voltage is used to make, when the first primary node is electrically connected with the subsequent-stage node adjacent to the first primary node, the background radiation charges in the first radiation charges fully or partially remain in the first primary node.

12. The pixel unit according to claim 11, wherein the first threshold voltage and the second threshold voltage are static values within a preset range, or the first threshold voltage and the second threshold voltage are dynamic values that vary depending on an amount of the first radiation charges.

13. The pixel unit according to claim 11, wherein the first threshold voltage is not greater than a first primary node voltage, and the first primary node voltage refers to a maximum value of the voltage converted from charges stored in the first primary node.

14. The pixel unit according to claim 11 wherein a first radiation charge converted voltage refers to a value of the voltage converted from the first radiation charges stored in the first primary node; and the first threshold voltage is not smaller than a first radiation charge storage voltage.

15. The pixel unit according to claim 11, wherein the step that the second primary node of the at least two primary nodes that stores the background radiation charges and the echo radiation charges is electrically connected with the subsequent-stage node adjacent to the second primary node comprises:

the second primary node being electrically connected with the subsequent-stage node adjacent to the second primary node, and the second primary node being electrically disconnected with a photosensitive unit, wherein the photosensitive unit is configured to receive a first radiation to generate the background radiation charges and receive a second radiation to generate the background radiation charges and the echo radiation charges.

16. The pixel unit according to claim 11, wherein when at least one of the subsequent-stage nodes comprises nodes of multiple stages, threshold voltages between the nodes of multiple stages increase along a direction of transferring charge.

17. The pixel unit according to claim 11, further comprising a photosensitive unit, configured to, before the determining unit determines the first threshold voltage between the first primary node of the at least two primary nodes that stores the first radiation charges and the subsequent-stage node:

generate the first radiation charges based on a first radiation received within a first predetermined time period, and transferring the first radiation charges to the first primary node for storage, the first radiation comprising a background radiation; and generate the second radiation charges based on a second radiation received within a second predetermined time period, and transferring the second radiation charges to the second primary node for storage, the second radiation comprising a background radiation and an echo radiation.

18. The pixel unit according to claim 17, wherein an exposure duration corresponding to generating the background radiation charges is the same as an exposure duration corresponding to generating the echo radiation charges.

19. The pixel unit according to claim 11, further comprising a resetting unit, configured to:

reset the at least two primary nodes and the subsequent-stage nodes, after the separating unit controls the second threshold voltage between the second primary node and the subsequent-stage node to transfer the echo radiation charges to the subsequent- stage node.

20. An array, wherein the array comprises a plurality of pixel units according to claim 11.

* * * * *